UNITED STATES PATENT OFFICE.

CHRISTOPHER RIS, OF BASLE, SWITZERLAND, ASSIGNOR TO JOHN R. GEIGY & CO., OF SAME PLACE.

BLACK AZO DYE.

SPECIFICATION forming part of Letters Patent No. 575,904, dated January 26, 1897.

Application filed August 13, 1896. Serial No. 602,589. (Specimens.)

*To all whom it may concern:*

Be it known that I, CHRISTOPHER RIS, a citizen of the Swiss Confederation, residing at Basle, Switzerland, have invented certain new and useful Improvements in Processes of Producing Black Azo Dyes, of which the following is a specification.

This invention relates to the production of new black azo coloring-matters derived from paradiamidoditolylamin and paradiamidophenyltolylamin. These paradiamins have not been used heretofore for the preparation of azo colors, and I am the first who succeeded in producing new black azo dyestuffs from the same.

As the production of the bases referred to has not been described heretofore in any publication, I will first describe some particulars thereof.

Paradiamidoditolylamin is prepared by reduction of the indamin formed by oxidation of one molecule of paratoluylendiamin with one molecule of orthotoluidin in the form of their hydrochlorates, dissolved in cold water by addition of bichromate of potash. The blue indamin color which is obtained possesses probably the following formula:

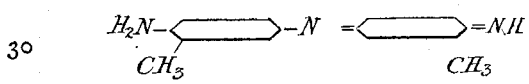

and is reduced with powder of zinc and hydrochloric acid till an uncolored solution is obtained and transformed into the said paradiamidoditolylamin.

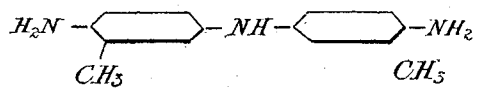

The production of paradiamidophenyltolylamin is carried out by reduction of the indamin formed by oxidizing paraphenylendiamin together with orthotoluidin or paratoluylendiamin with anilin.

The production of the new dyestuffs consists in the combination of the tetrazo compound of one molecule of the named paradiamins in alkaline solution with one molecule of $beta_1$ $alpha_4$ amidonaphthol $beta_3$ sulfo-acid, and directly or after a further diazotation with metadiamin or with one molecule of the same sulfo-acid and another molecule of metadiamin.

The new coloring-matters are distinguished by much more bluish and intense shades than those which are derived from paradiamidodiphenylamin.

In practically carrying out my invention I proceed according to the following examples:

Example I: Thirty kilograms of hydrochlorate of paradiamidoditolylamin are diazotized in about five hundred liters of water at 0° centigrade, with thirty kilograms of hydrochloric acid of 21° Baumé and fourteen kilos of sodium nitrite, upon which a solution of twenty-five kilograms of carbonate of sodium and a solution of twenty-six kilograms of $beta_1$ $alpha_4$ amidonaphthol $beta_3$ sulfonate of sodium is added. The intermediary compound results as a dark-brown precipitate from the red-colored solution. Then the mass is mixed with a solution of twelve kilograms of metatoluylenediamin. As the coloring-matter contains still zinc-salt, resulting from the reduction of the indamin, it is precipitated by acidulating with hydrochloric acid, then filtered off, washed out, dissolved in hot water by means of soda, precipitated with common salt, again filtered off, and dried. It dyes unmordanted cotton deep bluish-black shades. In this example, instead of $beta_1$ $alpha_4$ amidonaphthol $beta_3$ sulfo-acid, may be used its alkylated derivatives with almost the same practical result.

Example II: The intermediary compound from thirty kilograms of hydrochlorate of paradiamidoditolylamin and twenty-six kilograms of sodium salt of $beta_1$ $alpha_4$ amidonaphthol $beta_3$ sulfo-acid, prepared as described in the first example, is acidulated with some excess of hydrochloric acid and then diazotized with seven kilograms of nitrite of sodium. Then the tetrazo-azo compound thus formed is first combined in an alkaline solution with twenty-six kilograms of sodium salt of $beta_3$ $alpha_4$ amidonaphtholbeta$_3$ sulfo-acid, and then with eleven kilograms of metaphenylendiamin. The coloring-matter is worked up as described in the first example. It dyes bluish-black shades. In this example the second molecule of $beta_1$ $alpha_4$ amidonaphthol$beta_3$ sulfo-acid may be replaced by its alkylated derivatives.

Example III: The intermediary and further diazotized compound prepared according to Example II from thirty kilograms of hydrochlorate of paradiamidoditolylamin and twenty-six kilograms of $beta_1$ $alpha_4$ amidonaphthol$beta_3$ sulfonate of sodium is combined with twenty-four kilograms of metatoluylenediamin and the coloring-matter purified, as above described. It dyes deep black shades. In this example the alkylated $beta_1$ $alpha_4$ amidonaphthol$beta_3$ sulfo-acids are not enabled to replace the said acid itself, because they are not diazotizable.

Instead of thirty kilograms of hydrochlorate of paradiamidoditolylamin there can be brought into the reaction the equivalent quantity of hydrochlorate of paradiamidophenyltolylamin, giving quite similar results.

In every case the product is a coloring-matter which dyes unmordanted cotton or mixed goods, such as half silk or half woolen, deep bluish-black shades of great fastness. The color forms a black powder, soluble in water with black color and soluble in concentrated sulfuric acid with blue color. The solution in water is transformed by reduction into an uncolored solution containing paradiamidoditolylamin or paradiamidophenyltolylamin, besides the amido derivatives of the compounds forming the other part of the molecule, according to the well-known general reaction of azo dyes.

I claim—

1. The process herein described of producing new black azo colors, which consists in combining the tetrazo compound of a paradiamin, such as paradiamidoditolylamin with $beta_1$ $alpha_4$ amidonaphthol$beta_3$ sulfo-acid and with a metadiamin, substantially as described.

2. The new black azo coloring-matter derived from the reaction of a paradiamin with $beta_1$ $alpha_4$ amidonaphthol$beta_3$ sulfo-acid and a metadiamin, and which forms a black powder, soluble in water with bluish-black color, soluble in concentrated sulfuric acid with blue color, and which is transformed by complete reduction into a colorless solution, substantially as set forth.

In testimony that I claim the foregoing as my invention I have signed my name in presence of two subscribing witnesses.

CHRISTOPHER RIS.

Witnesses:
  GEORGE GIFFORD,
  CHARLES GEIGY.